(12) United States Patent
Green

(10) Patent No.: US 11,554,885 B1
(45) Date of Patent: Jan. 17, 2023

(54) SATELLITE RESCUE SYSTEM AND METHOD

(71) Applicant: H G TECHNOLOGIES, LLC, Palm Beach, FL (US)

(72) Inventor: David L. Green, Bradenton, FL (US)

( * ) Notice: Subject to any disclaimer, the term of this patent is extended or adjusted under 35 U.S.C. 154(b) by 0 days.

(21) Appl. No.: 17/340,757

(22) Filed: Jun. 7, 2021

(51) Int. Cl.
B64G 1/64 (2006.01)
B64G 1/00 (2006.01)
B64G 1/40 (2006.01)
B64G 1/66 (2006.01)
B64G 1/44 (2006.01)
B64G 1/42 (2006.01)

(52) U.S. Cl.
CPC .............. B64G 1/646 (2013.01); B64G 1/002 (2013.01); B64G 1/40 (2013.01); B64G 1/428 (2013.01); B64G 1/443 (2013.01); B64G 1/645 (2013.01); B64G 1/66 (2013.01)

(58) Field of Classification Search
CPC .......... B64G 1/646; B64G 1/002; B64G 1/40; B64G 1/428; B64G 1/443; B64G 1/645; B64G 1/66
See application file for complete search history.

(56) References Cited

U.S. PATENT DOCUMENTS

| 4,664,344 | A | 5/1987 | Harwell et al. |
| 5,094,410 | A * | 3/1992 | Johnson ................. B64G 1/646 244/172.4 |
| 5,511,748 | A | 4/1996 | Scott |
| 6,843,446 | B2 | 1/2005 | Scott |
| 7,070,151 | B2 | 7/2006 | D'Ausilio et al. |
| 7,370,834 | B2 | 5/2008 | Scott |
| 7,575,199 | B2 | 8/2009 | D'Ausilio et al. |
| 7,828,249 | B2 * | 11/2010 | Ritter ..................... B64G 1/646 244/172.4 |
| 7,857,261 | B2 * | 12/2010 | Tchoryk, Jr. ........... B64G 1/646 280/514 |
| 7,866,607 | B2 | 1/2011 | Benedict |
| 7,905,453 | B2 | 3/2011 | Benedict |
| 8,074,935 | B2 | 12/2011 | Gryniewski |
| 9,764,478 | B2 * | 9/2017 | Roberts ................ B25J 15/0226 |
| 9,796,484 | B2 | 10/2017 | Sauzay et al. |
| 9,950,424 | B2 | 4/2018 | Roberts et al. |
| 10,610,504 | B2 | 4/2020 | Halsband et al. |

FOREIGN PATENT DOCUMENTS

| CN | 201510849655 | 7/2017 |
| EP | 2907768 | 5/2019 |

* cited by examiner

Primary Examiner — Valentina Xavier

(57) ABSTRACT

A satellite rescue system (SRS) (1) for rescue and recertification of dormant satellites, said SRS having a thruster end (13) with a primary propulsion nozzle (11) and maneuvering thrusters (12) and a satellite connection end (8) with a body (15) between both ends. The satellite connection end of the SRS has an interface ring (14) with clinch clamps (4) that securely attach to a ring (3) on the rescued satellite. An umbilical connector (7) on the satellite connecting end of the SRS provides power and data to the rescued satellite.

5 Claims, 6 Drawing Sheets

| IDENTIFIED PROBLEMS | MISSIONS |
|---|---|
| 1 Stranded Satellites | GTO/LEO-GEO Satellite Rescuing |
| 2 Crowding and Collisions | Orbital Debris Removal |
| 3 Satellite Lifetime and Retirement | GEO Satellite Retirement |
| 4 National Security | Military Satellite Maneuvering |
| 5 Demand and Uncertainty for Constellations | (LEO) Constellation Reconfiguration |
| 6 New Markets or Market Shift | Satellite Repositioning |
| 7 Massive Space Systems | On-Orbit Assembly/Building |
| 8 Fuel Requirements | NSSK/Orbit Raising/Decay Prevention |

FIG. 9

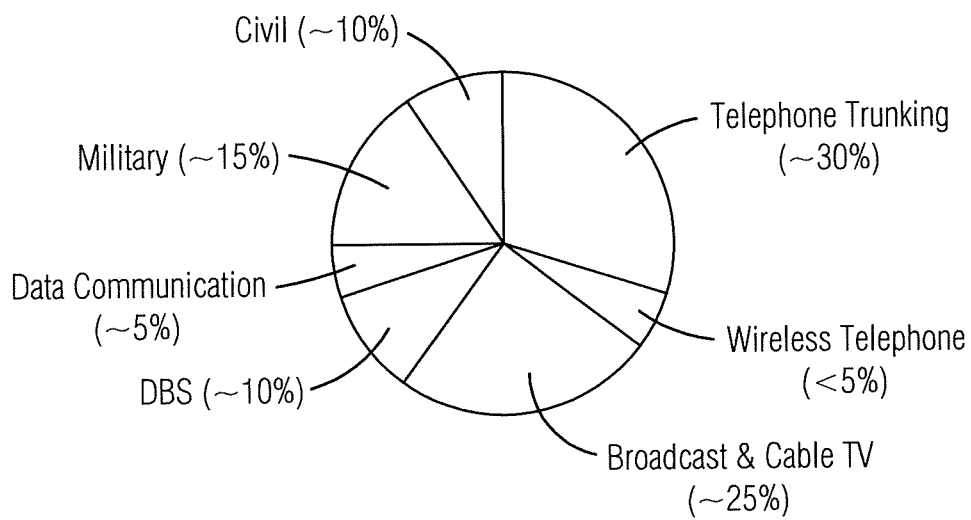

FIG. 10

SATELLITE RESCUE SYSTEM AND METHOD

BACKGROUND OF THE INVENTION

This invention relates to satellites and more particularly to a satellite rescue and recertification module having fuel, electrical power and updated electronics that would be launched and maneuvered to connect to a dormant satellite by clamping or pairing separation rings and establishing propulsion, electrical and electronic connections with the dormant satellite.

Currently, there is no accepted method or system for refueling a satellite while in orbit. Thus, once a satellite has expended its fuel supply, ultimately it falls back to earth entering the earth's atmosphere and burning up upon reentry or in many cases being too large to burn up and hitting the earth with potentially devastating consequences. The magnitude of the problem is enormous as a multitude of satellites are guaranteed to run out of fuel and fall back to earth. Many notable instances of the latter happening include NASA's Upper Atmosphere Research Satellite (UARS) which fell back to earth in the Pacific and ESA's Gravity field and steady-state Ocean Circulation Explorer (GOCE) near the Falkland Islands.

NASA has dedicated millions of dollars over an extended period of time to develop a mechanism for accomplishing this task. An example of NASA's efforts can be seen with the Robotic Refueling Mission and their $300,000,000 (Cost for Dexter alone) satellite refueling robot, Dexter, plus the additional cost of the primary satellite carrying the Dexter Robotic system. While Dexter may be a viable approach, it remains as a very costly, complex and risky option. Furthermore, it is yet to be determined if this solution will actually be feasible in the long-term or if it can even transition to an end-user other than NASA.

In addition to the problem of satellites running out of fuel and falling back to earth uncontrollably, other problems involve satellites running out of electrical power and becoming nonfunctional, needing updates in computer software, data or otherwise in order to keep performing its task.

Thus, a need exists for a system and method incorporating devices which will be able to rescue satellites so they will not fall back to earth uncontrollably, but be steered to a safer trajectory and for updating a satellite while in orbit.

Other attempts to address this issue include the following references, but none disclose a satellite rescue and recertification system and method as the present invention:

| Patent/Application No. | Inventor | Issue/Pub. Date |
| --- | --- | --- |
| 4,664,344 | Harwell et al. | May 12, 1987 |
| 5,511,748 | Scott | Apr. 30, 1996 |
| 6,843,446 | Scott | Jan. 18, 2005 |
| 7,370,834 | Scott | May 13, 2008 |
| 7,070,151 | D'Ausilio et al. | Jul. 4, 2006 |
| 7,575,199 | D'Ausilio et al. | Aug. 18, 2009 |
| 7,866,607 | Benedict | Jan. 11, 2011 |
| 7,905,453 | Benedict | Mar. 15, 2011 |
| 8,074,935 | Gryniewski | Dec. 13, 2011 |
| EP 2,907,768 | Schmid | May 1, 2019 |
| CN201510849655 |  | Jul. 28, 2017 |
| 9,764,478 | Roberts et al. | Sep. 19, 2017 |
| 9,950,424 | Roberts et al. | Apr. 24, 2018 |
| 9,796,484 | Sauzay et al. | Oct. 24, 2017 |
| 10,610,504 | Halsband et al. | Apr. 7, 2020 |

SUMMARY OF THE INVENTION

The primary object of the present invention is to provide a satellite rescue system and method that will be able to prevent the rampant problem of satellites falling back to earth in an uncontrollable fashion potentially with devastating consequences.

Another object of the present invention is to provide such a satellite rescue system and method that will enable satellites to be restarted, updated or restored to use.

The present invention fulfills the above and other objects by providing a system and method involving support satellites for manually and autonomously capture advantageous satellites, providing propulsion, maneuvering, power, and de-orbiting a free-flying spacecraft, using a satellite rescue system (SRS). The capture of the spacecraft includes the steps of optically seeking and ranging a satellite using LIDAR, matching tumble rates as needed, converging and anchoring with the satellite. Anchoring with the spacecraft may be done using supervised autonomy, allowing the SRS to execute a sequence of instructions with override intervention from a remote human-occupied ground location. These instructions may be stored at a remote ground support station that is uplinked to the SRS for the execution of maneuvers and anchoring upon remote command. The remote operator maintains the ability to abort the command at any time, as well as the ability to intervene using manual override maneuvers, anchoring, and power/data port connection.

The present invention proposes not to refuel a satellite, but to provide a permanently-mounted propulsion, power supply, communication, and guidance system by utilizing a satellite's separation ring, originally used in launching and separation/deployment of the satellite, as the anchoring point. The present invention repurposes the separation ring as the docking position, allowing the SRS to permanently mount the serviceable satellite with a new propulsion system, one that is self-sufficient with its fuel, propulsion system, guidance, communications, power, and associated sub-systems.

The present invention uses a propulsion subsystem consisting of small Reaction. Control System (RCS) thrusters coupled to a primary thruster, propellant tanks, and associated valves, filters, and fuel delivery system. Monopropellant (high purity) propellant is used to fuel the thrusters to minimize plume contamination. A large thruster propulsion subsystem can be used for a controlled burn reentry and higher altitude correction. The propulsion subsystem remains pressurized and sealed until use in de orbiting a dormant/decommissioned satellite. The RCS thrusters are used to point the SRS/Dormant satellite to the correct attitude in response to the commands from ground control. Primary thrusters will perform the large delta-v burns required for controlled burn reentry.

The above and other objects, features and advantages of the present invention should become even more readily apparent to those skilled in the art upon a reading of the following detailed description in conjunction with the drawings wherein there is shown and described illustrative embodiments of the invention.

DESCRIPTION OF THE DRAWINGS

In the following detailed description, reference will be made to the attached drawings in which:

FIG. 9 is a table setting forth the various problems and mission scenarios to be performed by the SRS of the present invention; and FIG. 10 is a circular pie chart of commercial satellite usage.

DESCRIPTION OF THE PREFERRED EMBODIMENTS

Figure 1:
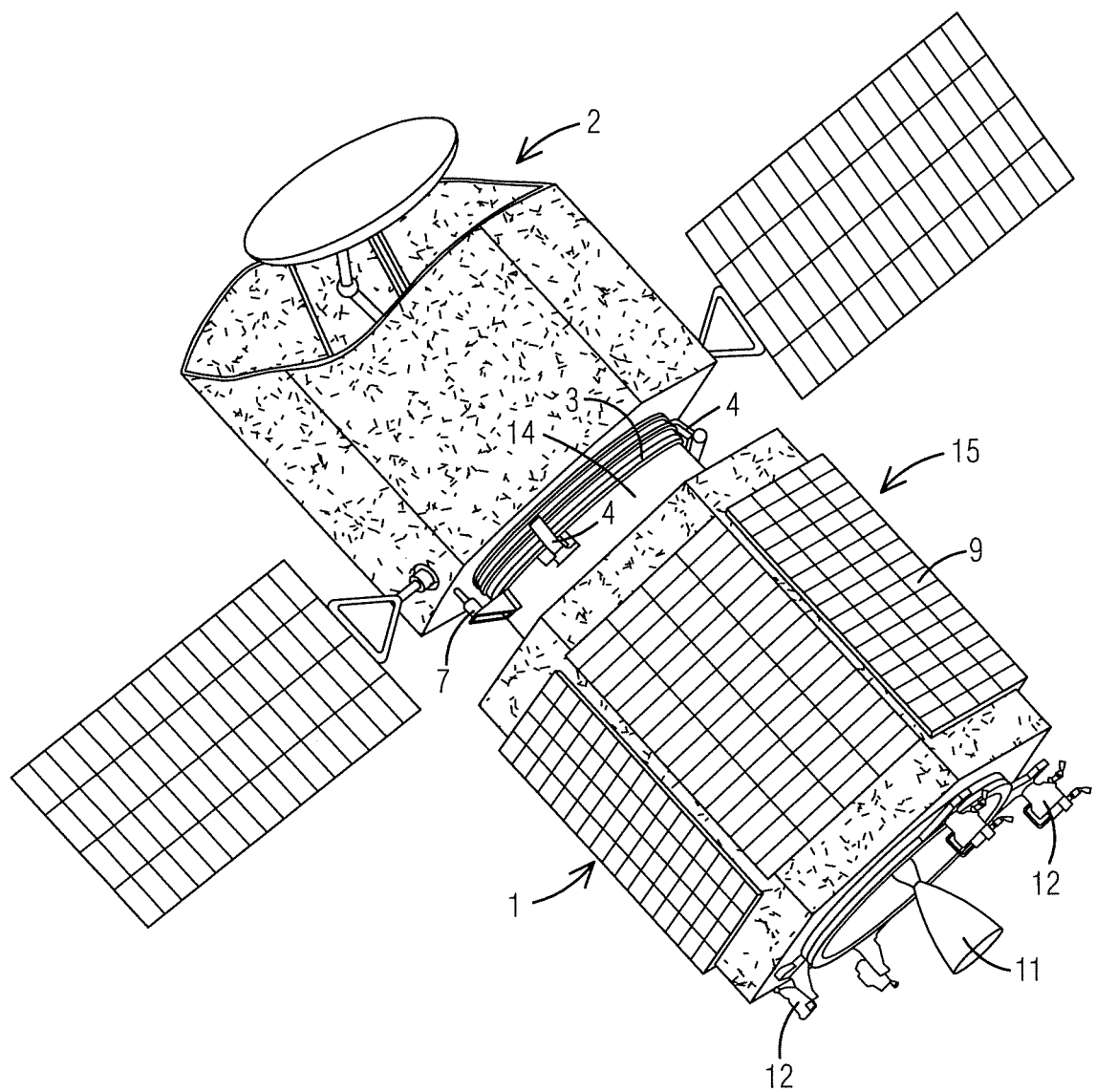
FIG. 1 is a side perspective view of the satellite rescue system (SRS) of the present invention docked with a dormant satellite.
Figure 2:
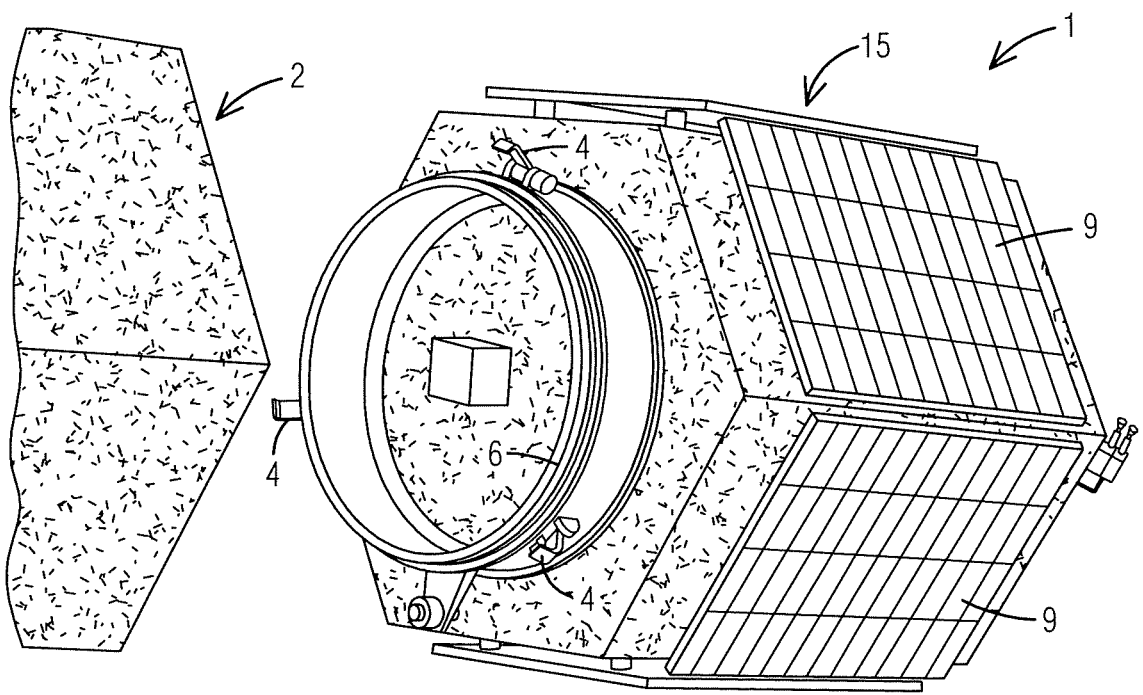
FIG. 2 is a side perspective view of the SRS of the present invention approaching/rendezvousing with a target satellite.

For purposes of describing the preferred embodiment, the terminology used in reference to the numbered items in the drawings is as follows:

1. Satellite Rescue System, generally (SRS)
2. rescued satellite
3. satellite separation ring
4. clinch clamps
5. primary thruster
6. SRS clinch ring
7. umbilical connector
8. SRS connecting end
9. SRS solar panels
10. sensor suite
11. primary propulsion nozzle
12. maneuvering thrusters
13. SRS thruster end
14. SRS interface ring
15. Body of SRS Referring now to the drawing figures, FIGS. 1 and 2 are perspective views of a Propulsion Module Satellite (SRS) 1 of the present invention docked to a dormant satellite 2 is illustrated. The objective of the present invention is not to refuel a satellite, but to provide a permanently mounted propulsion, power supply, communication, and guidance system. By utilizing a satellite's separation ring 3 as the anchoring point allows the SRS 1 to use clinching clamps 4 to permanently mount a rescued satellite 2 with a new propulsion system, one that is self-sufficient with its fuel, propulsion system, guidance, communications, power, and associated sub-systems.

The propulsion subsystem of the SRS 1 comprises small Reaction Control System (RCS) thrusters (shown later in FIG. 7) coupled to a primary thruster 5, propellant tanks, and associated valves, filters, and fuel delivery system. Mono-propellant (high purity) propellant is used to fuel the thrusters to minimize plume contamination. The large thruster propulsion subsystem is used for a controlled burn reentry and higher altitude correction. The propulsion subsystem remains pressurized and sealed until use in de-orbiting a dormant/decommissioned satellite. The RCS thrusters are used to point the SRS/Dormant satellite to the correct attitude in response to the ground control commands and the primary thrusters will perform the large delta-v burns required for controlled burn reentry.

The relative navigation sensor selection is based on requirements for redundancy, range capabilities, and Technology Readiness Level (TRL). Two different types of sensors are required for redundancy. The following sensors may be used, other sensors and combinations of sensors fall within the scope of this design: Longer Range Sensors (Beginning at 5-3 km): Primary: Optec Light Detection and Ranging (LIDAR), Secondary: Laser Camera System (LCS), close-range sensors (10 m and closer): Primary: Enhanced Advanced Video Guidance Sensor (EAVGS) Secondary: Natural Feature Imaging Recognition (NFIR), a system of Digital Video Cameras (DVC) with various focal lengths positioned to align with the beneficial satellite features/targets. These sensors are illustrated and described later in relation to FIG. 5.

The Satellite rescue system (SRS) communications sub-system is made up of a 5-band system using two multi-mode transceivers paired with low-gain antennas (LGA) for command uplink and telemetry transmission at low data rates through the Tracking and Data Relay Satellite (TDRS) system. High-rate data, video, required during pursuit, capture, proximity operations are passed through the communications system, Ku-band transmitters, and high-gain antennas for downlink through the TDRS. The S-band system through the TDRS is capable of command reception at 2 Kbps and 16 Kbps and transmits telemetry at between 2 and 16 Kbps. The SRS will be capable of command reception at 2 Kbps and transmit between 4 and 16 Kbps. Data rates may change per requirements.

The electrical power system (EPS) of the SRS 1 provides power to the beneficial satellite 2. The calculated electrical needs of a targeted satellite 2 are fulfilled by an effective solar array area using triple-junction GaAs cells, ten 55-amp hour Li-ion batteries, and associated power conditioning and distribution hardware.

The thermal control sub-system of the SRS 1 must control temperatures within hardware limits and ensure that there is no greater than 5 W of thermal conductivity from the SRS 1 and the Target Satellite 2. Based on prior known and proven methodology, heat pipes and software-controlled heater circuits to provide the required hardware component thermal environments for all mission phases may be an option.

Each SRS system will be developed by right-sizing and utilizing commercial, off the shelf components to reduce costs and provide a tailored approach that will adapt to various satellite platforms and their specifications (size, weight, mission, etc.). This concept proposes re-energizing satellites that are already in orbit, therefore the need for a propulsion mechanism would be for Station Keeping or Attitude Control (North-South station keeping, Orbit topping, Momentum dumping, East-West keeping, Orbit raising, De-orbiting, and Interplanetary propulsion), Guidance, Pointing Mechanisms (Pointing Gimbals), provide Electrical power and data connection. An example of the types of propulsion systems that should be considered includes cold-gas and mono-propellant systems, which are inherently more simplistic, reliable, cost-effective, and can provide low to moderate thrust levels of approximately 0.0045N to 450N respectively. The use of compact propulsion mechanisms will also be instrumental in freeing up critical real estate onboard the SRS system, thus allowing for the possibility of additional payloads and capabilities to enhance existing satellite platforms connection.

Figure 3:
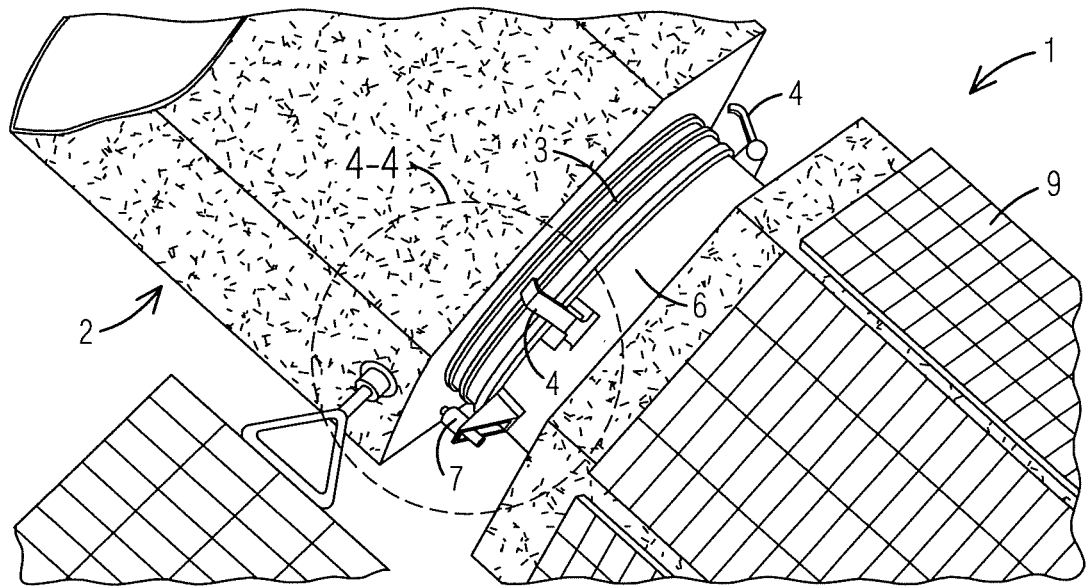
FIG. 3 is a side perspective view of the SRS of the present invention mating with a target satellite.

As illustrated in FIG. 3, the SRS 1 will utilize the satellite separation ring 3 to connect to the rescued satellite 2 needing re-energizing, providing propulsion, maneuverability, power, data streaming, and controlled de-orbiting if or when necessary. This will be accomplished by using a three-point motorized anchoring system consisting of clinch clamps 4 on the satellite separation ring 3. After rendezvous of the rescued satellite 2 and the SRS 1, will position and orientate itself aligning the separation rings 3 and the electrical interface via the umbilical connector 7 using an incorporated artificial intelligence (AI), a sensor suite housing cameras, LIDAR and positioning sensors as illustrated in and discussed in relation to FIG. 5.

As further illustrated in FIG. 3 the SRS 1 and satellite 2 having completed the connection process showing the SRS clinch ring 6 and satellite separation ring 3 secured together by clinch clamps 4 with electrical power connection through the umbilical connector 7.

Figure 4:
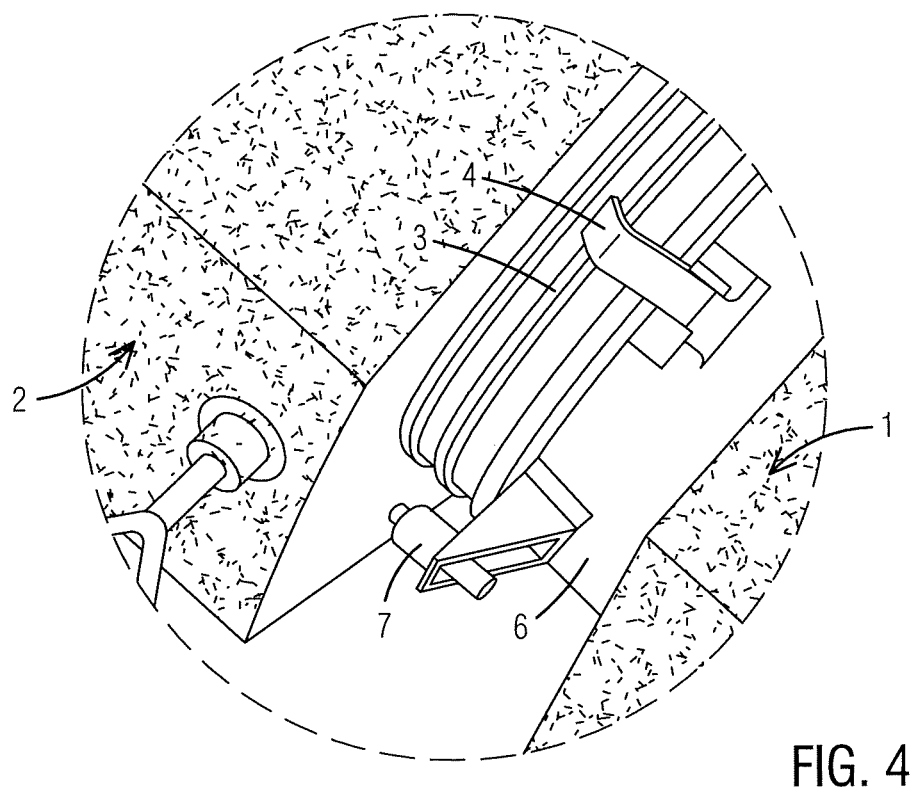
FIG. 4 is an enlarged view of the circular area 4-4 of FIG. 3 of the connection of the SRS of the present invention to a target satellite.

FIG. 4 is an enlarged illustration of the section 3-3 of FIG. 3 showing the static connection between the SRS 1 and the satellite 2 with one of the clinch clamps 4 connecting the SRS separation ring 6 to the satellite separation ring 3 with umbilical connector 7.

Figure 5:
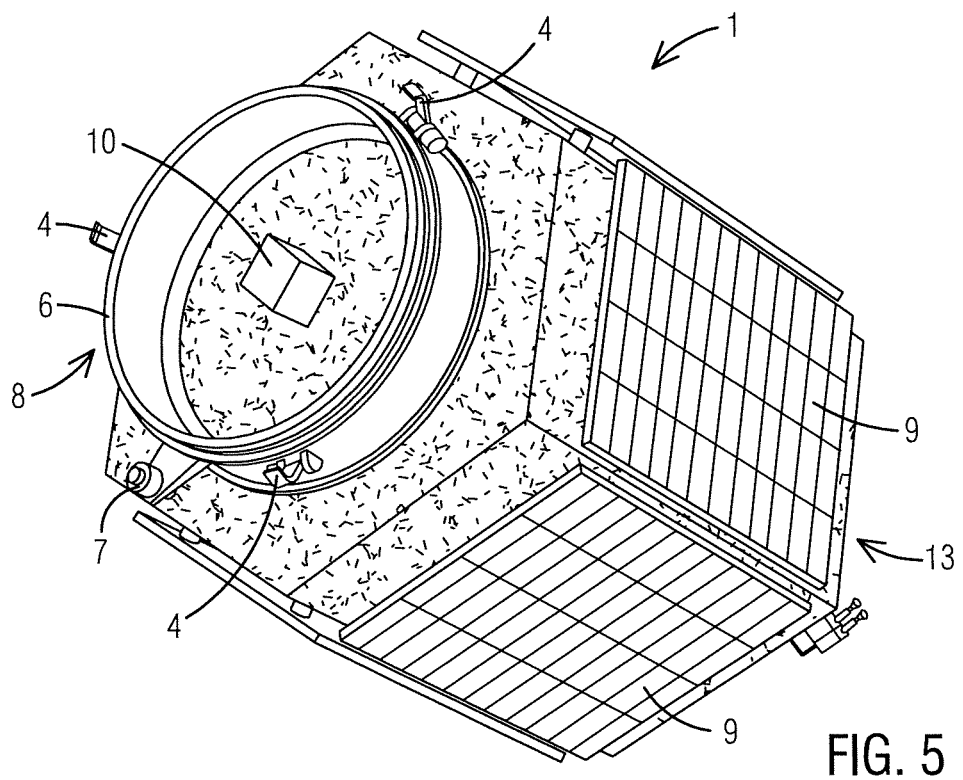
FIG. 5 is a perspective view of the satellite connection end of the SRS of the present invention.
Figure 6:
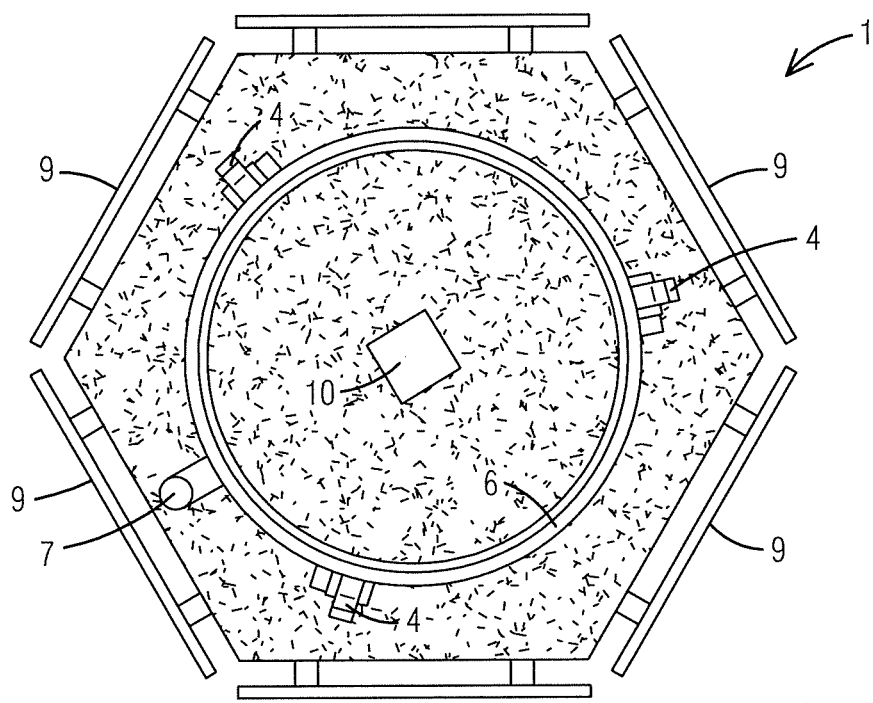
FIG. 6 is a top view of the connection end of the SRS of the present invention.

FIGS. 5 and 6 are perspective and top views respectively, of the connecting end 8 of the SRS 1 of the present invention, the clinch clamps 4 on the separation ring 6 and the umbilical deployable power/data connector 7. Solar panels 9 surround the exterior of the SRS 1 to supplement and provide electrical power to the SRS 1 and rescued satellite 2. Finally, a sensor suite 10 is located within a circumference of the SRS separation ring 6, said sensor suite having an array of sensors, such as an infrared red camera, LIDAR, camera with light, micro meter camera, sun sensor and other sensors as deemed necessary depending on a particular mission. The SRS 1 would likely use off the shelf course-pointing mechanisms (not shown) to guide it in its rendezvous with a satellite, a course pointing assembly consisting of three main assemblies-a support assembly, an azimuth scan unit and an elevation scan unit, plus fine pointing assemblies, such as 2-axis tip-tilt, angular range: +/−10 mrads and signal-band with of 1 kHz (~3 db.) the front gate 1 removed and a front gate 2 by itself as it might appear when made of plastic.

Figure 7:
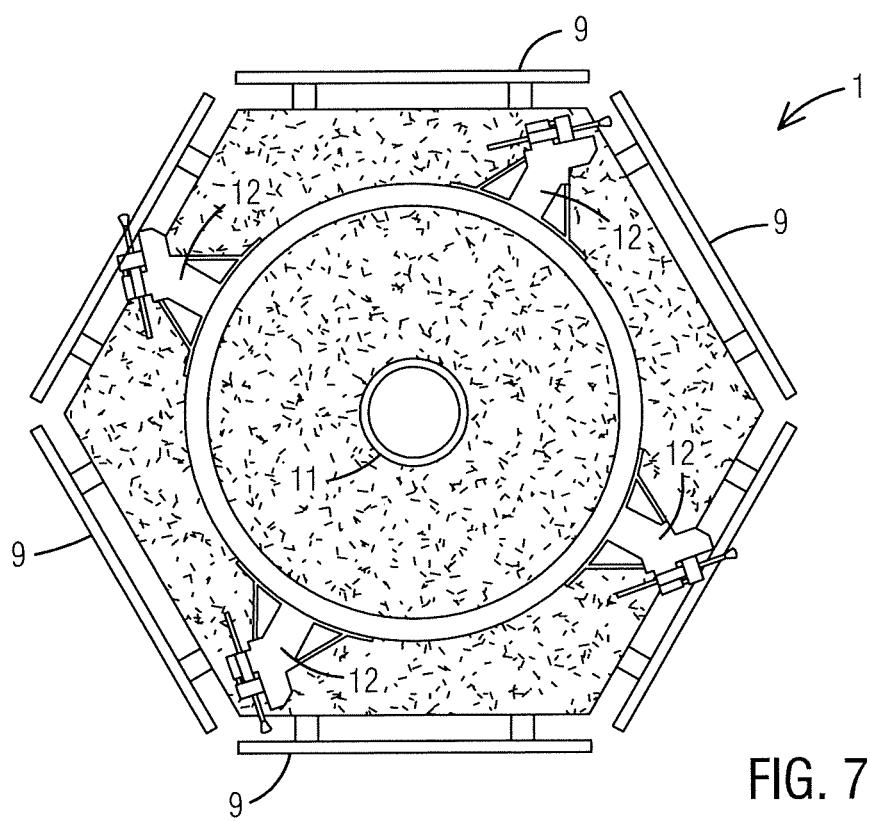
FIG. 7 is a bottom view of the thruster end of the SRS of the present invention.

FIG. 7 illustrates the SRS 1 from the thruster end showing the primary propulsion nozzle and a plurality of maneuvering thrusters about its perimeter.

Figure 8:
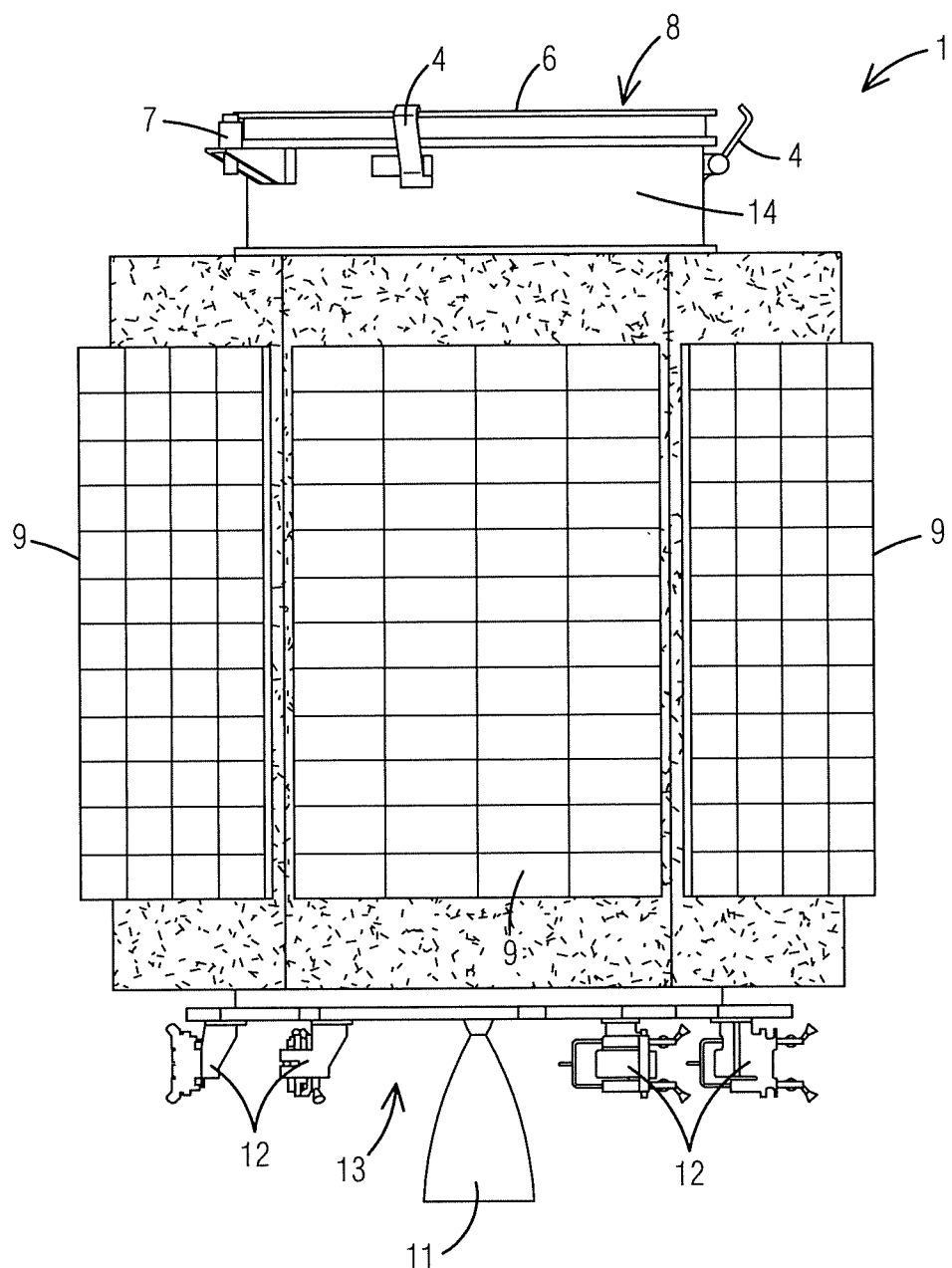
FIG. 8 is a side view of the SRS of the present invention.

FIG. 8 is a side view of the SRS 1 having a satellite connecting/clinching end 8 with clinch clamps 4 located at three points on a clinch ring 6 extending from a SRS clinch ring 6. Additionally, a deployable power/data connector is located on the SRS clinch ring 6. The thruster end 14 contains the primary propulsion nozzle and the numerous maneuvering thrusters 13 about its periphery. Finally, an array of solar panels 9 surround the sides of the SRS 1 in the body 15 between the connecting end 8 and thruster end 15 of the SRS 1.

The applications of the Satellite rescue system (SRS) 1 of the present invention are numerous, but can be generally grouped into three categories:
1. Orbit correction:
   a. station-keeping: maneuvering satellites to maintain their nominal position or track.
   b. rescuing emergency capture and insertion of stranded satellites into desired orbits.
2. Collision risk mitigation:
   a. debris removal: removing space debris from highly populated regions.
   b. satellite retirement: moving dysfunctional satellites to "graveyard" altitudes or performing a safe controlled deorbit.
3. On-demand maneuvers:
   a. military: providing flexible and unpredictable relocation of US military satellites.
   b. civil: changing the location of a satellite due to a shift in the market or scientific interest.

In addition to these functions, the Satellite rescue system (SRS) can be used to assess the current position, orientation, and operational status of satellites.

FIG. 9 is a table listing the major problems that can be mitigated using the SRS 1 of the present invention, along with a brief discussion of their corresponding mission scenarios.

Mission 1: Failures of rockets' upper stages are not a rare occasion (The typical launch success rate is 92%). As a result, satellites are left in useless orbits. The utilization of onboard fuel to boost the satellites up to the correct orbit is either impossible or would reduce immensely their expected operational life. The SRS could mitigate the problem, since saving a satellite's onboard propellant would allow it to operate as intended and produce revenues for the price of a given service fee. A SRS could also be used for transferring a satellite to the ISS for repair and then moving it back to its operational orbit.

Mission 2: There are already too many objects in space, and we cannot continue sending more satellites without vacating some spaces. This overcrowding also poses the problem of high collision probability, especially in LEO above 500 km.

Mission 3: SRS allows satellites to stay longer in the operational orbit and to use up their entire fuel supplies. This extended lifetime can provide millions of dollars of additional revenue.

Mission 4: National security is the reason why we need surprise maneuvers of military satellites. Currently, adversaries can time their ground activities due to the predictability of overhead passes of spy satellites. The maneuverability of these satellites is limited by the availability of on-board fuel supplies, but a SRS could mate with the satellites and transfer them to the desired location. Additionally, military satellites are quite expensive, therefore another potential use for a Satellite rescue system (SRS) is to simply correct for orbital drift or decay and thus extend the satellite's life.

Mission 5: The traditional way of designing constellations of communications satellites is to optimize the design for a specific global capacity, based on a forecast of the expected number of users and their activity level, both of which are highly uncertain. This can lead to economic failure if the actual demand is smaller than the one predicted. It is better to deploy the constellation progressively, increasing the number of satellites as needed through reconfiguring the existing constellation on orbit. A SRS is needed so that the satellites do not exhaust their fuel, especially since they may have to alter their location several times.

Mission 6: Satellites might need to be relocated to cover a different part of the Earth if the market there is bigger. A SRS can capture and move them so that their operational lives are not shortened by fuel depletion.

Mission 7: Mass and volume have always been an issue in space systems deployment, the biggest constraint being imposed by launch vehicles capabilities. On-orbit assembly of space assets, however, offers a solution to the problem. It also allows for expensive projects to be initiated without the need of having the entire budget available up-front. Additionally, it reduces the financial risks in case of launch failure or a spacecraft subsystem failure, since only the failed module would need to be replaced. It would be cost-effective to have SRS moving the assembly parts and modules, as opposed to adding propulsion tanks and guidance control systems to the separately launched parts of the assembly.

Mission 8: Satellites can trade fuel for payload or smaller launch vehicle, orbit raising, or decay prevention is done by a SRS that attaches itself to the satellite. Of the mission scenarios set forth above, the GEO satellite retirement and the GTO/LEO-DEO satellite rescuing missions are the most value in the context of commercial space operations and thus deserve further discussion.

Communication satellites in GEO are large and expensive but, provided that the market demand for their services does not drop significantly, they are also extremely profitable. Thus, not surprisingly, the satellite industry is steadily evolving from being dominated by government and military activities to becoming a predominantly commercial arena. Currently, commercial telecommunications represent approximately 75% of the entire GEO sector, as shown in FIG. 10.

GEO communications satellites typically have a design life of 12 to 15 years. Usually, it is the amount of fuel available for station keeping that determines their lifespan. All on-board systems might be properly working and capable of continuing to function for a long time, but without fuel, the satellite cannot maintain its operational orbit—it drifts and becomes useless. To mitigate the problem of accumulating space debris, a United Nations policy requires that "at the end of operational life, geostationary spacecraft should be placed in a disposal orbit that has a perigee at least 300 km above the geostationary orbit". To comply with this regulation, satellites use their residual propellant for the transfer and often sacrifices at least six months of their design lifetime, which corresponds to a significant loss of economic value. However, when the SRS services are available, GEO/LEO satellites can be left in operational orbit until their propellant supplies are completely exhausted, then propulsion supplied by the SRS to continue its service or transferred to disposal or safe controlled deorbit by a SRS. This alternative will bring additional revenue to the satellite operator due to the extended use of onboard transponders. Assuming a typical commercial communication satellite that has 24 Ku-band and 24 C-band transponders with bandwidths of 36 MHz and using the most current transponder indices ($5,155/MHz/Month for Ku-band and 4,921/MHz/Month for C-band), the revenue that the satellite owner will earn from six extra months of satellite operation is more than $50M. With the SRS providing propulsion, maneuvering, and data uplink. The projected extended lifespan of an existing satellite in orbit could double, making the profitability could reach $1.5B over the extended lifetime. The exact amount would depend on the actual number of active transponders of each type and the length of period they are used, as well as on market demand fluctuations. A demand for SRS services in GEO/LEO orbit is justified and expected.

In view of the above the value of a Satellite Rescue System of the present invention as described herein is readily apparent.

It is to be understood that while a preferred embodiment of the invention is described, it is not to be limited to the specific form or arrangement of parts herein described and shown. It will be apparent to those skilled in the art that various changes may be made without departing from the scope of the invention and the invention is not to be considered limited to what is shown and described in the specification and/or drawings.

Having thus described my invention, I claim:

1. A satellite rescue system for rescuing other satellites, said satellite rescue system comprising:
a spacecraft having a thruster end and a satellite connecting end with a body having sides between the thruster end and satellite connecting end; said satellite connecting end having a separation ring with a plurality of clinch clamps for attaching to a separation ring of a rescued satellite; an electrical/data connector extending from the satellite connecting end for mating with an electrical/data connection on the rescued satellite; said thruster end having a primary propulsion nozzle and a plurality of maneuvering thrusters; and said spacecraft having a guidance system for locating and guiding connection to a rescued satellite.

2. The satellite rescue system of claim 1 further comprising:
an array of solar panels attached around the body of the spacecraft or deployable, meeting mission requirements.

3. The satellite rescue system of claim 1 further comprising a sensor suite on the satellite connecting end, said suite having at least one from a group of sensors including an IT camera, LIDAR, a camera with light, a micro-meter camera a sun sensor.

4. A system for rescuing satellites using a satellite rescue system comprising a spacecraft having a thruster end and a satellite connecting end with a body having sides between the thruster end and satellite connecting end; said satellite connecting end having a separation ring with a plurality of clinch clamps for attaching to a separation ring of a rescued satellite; an electrical/data connector extending from the satellite connecting end for mating with an electrical/data connection on the rescued satellite; said thruster end having a primary propulsion nozzle and a plurality of maneuvering thrusters; and said spacecraft having a guidance system for locating and guiding connection to a rescued satellite, said system comprising:
a launch vehicle for placing the satellite rescue system in orbit in proximity of a satellite being rescued; the satellite rescue system being guided into a position so its connecting end with ring is aligned with the ring of the satellite; a plurality of clinch clamps on the ring of the satellite rescue system being activated to clamp onto the ring of the satellite being rescued; and the umbilical connector with data and power being securely connected to the satellite.

5. A method for rescuing satellites using a satellite rescue system comprising a spacecraft having a thruster end and a satellite connecting end with a body having sides between the thruster end and satellite connecting end; said satellite connecting end having a separation ring with a plurality of clinch clamps for attaching to a separation ring of a rescued satellite; an electrical/data connector extending from the satellite connecting end for mating with an electrical/data connection on the rescued satellite; said thruster end having a primary propulsion nozzle and a plurality of maneuvering thrusters; and said spacecraft having a guidance system for locating and guiding connection to a rescued satellite, said method comprising the steps of:
placing the satellite rescue system by using a launch vehicle in orbit in proximity of a satellite being rescued; guiding the satellite rescue system into a position so its connecting end with ring is aligned with the ring of the satellite; activating a plurality of clinch clamps on the ring of the propulsion module satellite to clamp onto the ring of the satellite being rescued; and connecting the umbilical connector with data and power to the satellite.

* * * * *